(12) United States Patent
Blakey et al.

(10) Patent No.: US 8,631,305 B2
(45) Date of Patent: Jan. 14, 2014

(54) REDUCING PROCESSING BIAS IN A SOFT FORWARD ERROR CORRECTION (FEC) DECODER

(75) Inventors: Stanley H. Blakey, Kanata (CA); Han Henry Sun, Ottawa (CA); Yuejian Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 22 days.

(21) Appl. No.: 13/435,823

(22) Filed: Mar. 30, 2012

(65) Prior Publication Data

US 2013/0259492 A1    Oct. 3, 2013

(51) Int. Cl.
*H03M 13/00* (2006.01)

(52) U.S. Cl.
USPC .......................................... 714/776; 714/752

(58) Field of Classification Search
None
See application file for complete search history.

(56) References Cited

U.S. PATENT DOCUMENTS

| | | | | |
|---|---|---|---|---|
| 7,856,584 B2 * | 12/2010 | Ovchinnikov et al. | ....... | 714/752 |
| 2005/0135253 A1 * | 6/2005 | Cai et al. | ....... | 370/236 |
| 2006/0215738 A1 * | 9/2006 | Kokkonen | ....... | 375/148 |

OTHER PUBLICATIONS

Knuth, "The Art of Computer Programming", Second Edition, vol. 3—Sorting and Searching, Stanford University, 780 pages, 1998.
Lin et al., "Error Control Coding: Fundamentals and Applications", Prentice-Hall Computer Applications in Electrical Engineering Series, 603 pages, 1983.
D. Chase: "A Class of Algorithms for Decoding Block Codes With Channel Measurement Information"; IEEE Transactions on Information Theory, vol. IT-18, No. 1, Jan. 1972, 13 pages.
R. Pyndiah et al.: "Near Optimum Decoding of Product Codes"; Telecom Bretagne, IEEE 1994, 5 pages.
R. Pyndiah: "Near-Optimum Decoding of Product Codes: Block Turbo Codes"; IEEE Transactions on Communications, vol. 46, No. 8, Aug. 1998; 8 pages.

* cited by examiner

*Primary Examiner* — Guerrier Merant
(74) *Attorney, Agent, or Firm* — Harrity & Harrity LLP; David L. Soltz

(57) ABSTRACT

A system is configured to receive a word that includes a group of samples; randomly select a subset of the samples; identify first samples, from the subset, with a lowest level of reliability; select another subset of the samples; identify second samples, from the other subset, with a lowest level of reliability; and create a merged subset based on selected first samples and selected second samples. The system is also configured to select a further subset of the samples; identify third samples, from the further subset, with a lowest level of reliability; identify fourth samples, from the merged subset, associated with a lowest level of reliability; create another merged subset based on a greater probability that fourth samples than third samples are included in the other merged subset; and generate another word based a sample from the other merged subset; and process the word using the other word.

26 Claims, 9 Drawing Sheets

US 8,631,305 B2

REDUCING PROCESSING BIAS IN A SOFT FORWARD ERROR CORRECTION (FEC) DECODER

BACKGROUND

In an increasingly networked world, more and more traffic, such as data, voice, and video, is transmitted over public and proprietary networks. The networks use high data rates (e.g., greater than 10 gigabits per second (Gbps)) to transport greater quantities of traffic. Certain types of the networks, such as optical networks, use complex signal processing to achieve the high data rates. The complex signal processing may be performed using forward error correction (FEC) devices, such as iterative soft decoders, that use soft iterative error correction techniques to reduce a quantity of errors, within the traffic, to a level that is specified by the public and proprietary networks. Certain error patterns associated with the traffic (e.g., locations of errors within an encoded word, etc.) can cause FEC devices to process errors in a manner that includes a bias in favor of certain errors (e.g., earlier occurring errors within an encoded word) and/or to dis-favor processing other errors (e.g., later-occurring errors within an encoded word). Processing the errors in the biased manner may reduce a quantity of errors that can be corrected by FEC devices and/or increase a processing time associated with processing errors within the traffic.

SUMMARY

According to one implementation, a system may include one or more devices to receive a word, of a block of words within traffic, on which to perform a forward error correction operation, the word may include a group of samples, and each one of the group of samples may include respective encoded bits and respective reliability bits. The respective reliability bits may correspond to a respective level of reliability of the respective encoded bits. The one or more devices may be to: select, in a random manner, a first subset of samples of the group of samples; identify one or more first samples, from the first subset, associated with one or more of lowest reliability bits within the first subset; select a second subset of samples of the group of samples, the second subset may be adjacent to the first subset; identify one or more second samples, from the second subset, associated with one or more of lowest reliability bits within the second subset; and create a first merged subset based on selected one or more first samples and selected one or more second samples. The one or more devices may be to: select a third subset of samples, of the group of samples; identify one or more third samples, from the third subset, associated with one or more of lowest reliability bits within the third subset; identify two or more fourth samples, from the first merged subset, associated with one or more of lowest reliability bits within the first merged subset; and create a second merged subset based on selected one or more third samples and on selected two or more fourth samples, the selected one or more third samples may be fewer than the selected two or more fourth samples, and each of the two or more fourth samples may correspond to an equal probability of being associated with the first subset or the second subset. The one or more devices may generate one or more candidate words based on one or more samples from the second merged subset and may process the word using the one or more candidate words.

According to another implementation, a method may include receiving, from an optical receiver and by a device, a group of words within traffic. Each of the group of words may include a group of samples, each of the group of samples may include a corresponding one of a group of encoded bits and respective reliability bits for identifying a respective level of reliability of the corresponding one of the group of encoded bits. The method may also include identifying, by the device and within a word of the group of words, subsets of the group of samples associated with the word, where each of the subsets may include a respective equal portion of the group of samples; selecting, by the device, a first one of the subsets and a second one of the subsets, where the first one of the subsets or the second one of the subsets may be selected in a random manner; determining, by the device, lowest first reliability bits within the first one of the subsets and lowest second reliability bits within the second one of the subsets; and creating, by the device, a first merged subset, based on first selected samples associated with lowest reliability bits from among first samples of the first one of the subsets and second samples of the second one of the subsets. The first samples may correspond to the lowest first reliability bits, and the second samples may correspond to the lowest second reliability bits. The method may further include determining, by the device, lowest third reliability bits within a third one of the subsets; and creating, by the device, a second merged subset based on second selected samples associated with lowest reliability bits from among the first selected samples and third samples of the third one of the subsets. The third samples may correspond to the lowest third reliability bits. There may be an equal probability that the second merged subset includes at least two of the first selected samples and at least one of the third samples. The method may also include generating, by the device, candidate words based on one or more of the second selected samples; and processing, by the device, the word using the candidate words.

According to a further implementation, a device may include a memory to store a block of words, within traffic, that are generated as a result of a forward error correction operation. Each word, of the block of words, may include a group of samples, a particular one of the group of samples may include encoded bits and reliability bits, and the reliability bits may identify a level of reliability of the encoded bits. The device may also include one or more components to obtain a word from the block of words; identify, in a random manner, a first segment of the word, where the first segment may include a first subset of samples of a group of samples associated with the word; select one or more first samples, from the first subset of samples, associated with one or more of first lowest reliability bits within the first subset of samples; identify a second segment associated with the word, where the second segment may include a second subset of samples of the group of samples associated with the word; and select one or more second samples, from the second subset of samples, associated with one or more of second lowest reliability bits within the second subset of samples. The one or more components may also be to identify a third segment associated with the word, where the third segment may include a third subset of samples of the plurality of samples associated with the word; select one or more third samples, from the third subset of samples, associated with one or more of third lowest reliability bits within the third subset of samples; and identify lowest reliability bits within the one or more first lowest reliability bits, the one or more second lowest reliability bits, and the one or more third lowest reliability bits. The one or more components may further be to create a merged subset of samples based on selected samples from the one or more first samples, the one or more second samples, and the one or more third samples, where the selected samples may correspond to the lowest reliability bits; select at least one sample from the merged subset; generate two or more candidate words based on the at least one sample; and process the word using the two or more candidate words.

DETAILED DESCRIPTION

Figure 1:
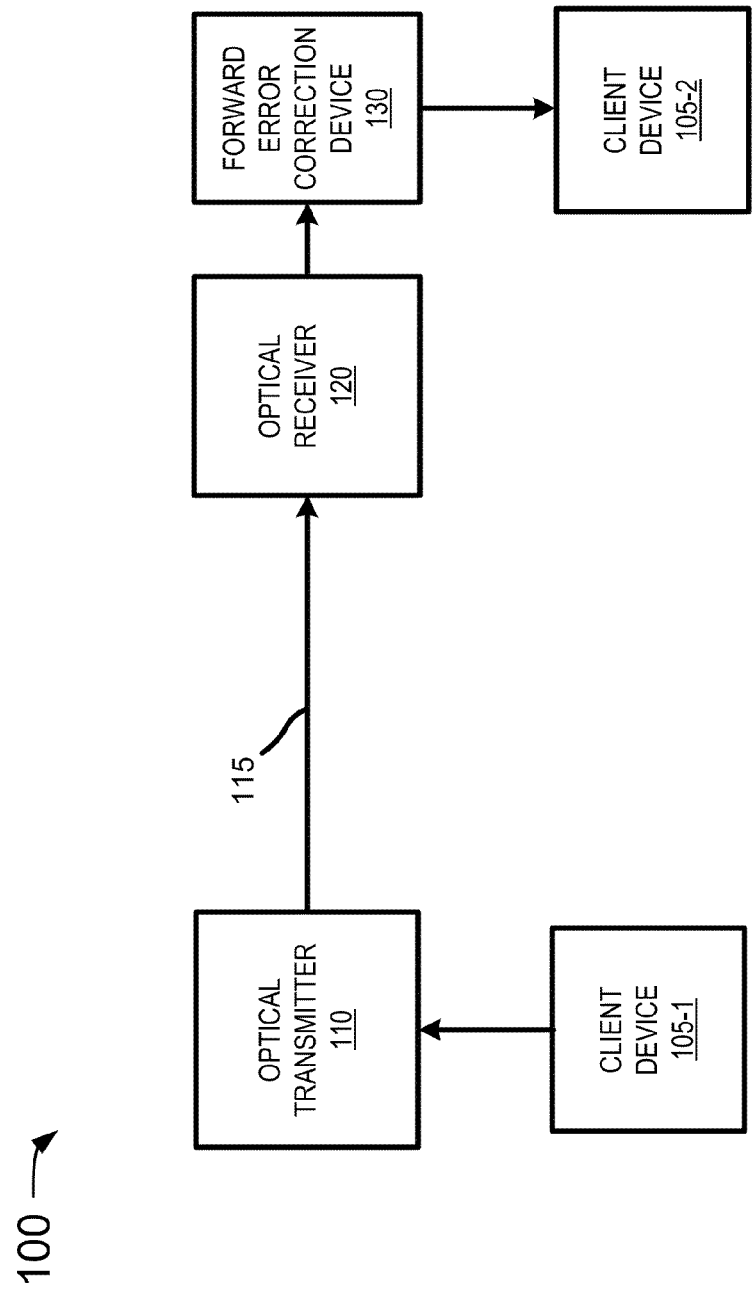
FIG. 1 is a diagram of an example network in which systems and/or methods described herein may be implemented.

The following detailed description refers to the accompanying drawings. The same reference numbers in different drawings may identify the same or similar elements.

A system and/or method, described herein, may allow a forward error correction device (hereinafter referred to as a "FEC device") to perform a soft iterative forward error correction operation, on a group of samples (hereinafter referred to as an "encoded word") within traffic, without introducing a processing error into the operation. A conventional FEC device may introduce the processing bias when performing a conventional soft iterative forward error correction operation on the encoded word. The processing bias may correspond to a greater probability that an earlier occurring error, within the encoded word, may be selected, for correction by the conventional FEC device, over a later occurring error within the encoded word. Avoiding the processing bias may permit the FEC device to correct a greater quantity of errors, over a period of time, than the conventional FEC device.

In an example implementation, the FEC device may select a subset of samples associated with an encoded word. The FEC device may also, or alternatively, identify one or more samples, within the subset, that are least reliable (e.g., based on a reliability value associated with each sample). The FEC device may select other subsets associated with the encoded word and may identify one or more other least reliable samples, within each of the other subsets. Additionally, or alternatively, the FEC device may create a merged subset based on the identified least reliable samples and the other least reliable samples. Additionally, or alternatively, the FEC device may select, from the merged subset, one or more of the least reliable samples and/or the other least reliable samples. The FEC device may also, or alternatively, use the selected least reliable samples to process the encoded word (e.g., to identify and/or correct of errors within the encoded word that correspond to the least reliable samples). When two or more of the selected least reliable samples correspond to a same reliability value, there may be an equal probability that the FEC device selects any one of the two or more least reliable samples, which may avoid introducing the processing bias.

Additionally, or alternatively, the FEC device may randomly select a first subset of an encoded word and may identify one or more first least reliable samples within the first subset. The FEC device may also, or alternatively, select a second subset of the encoded word and may identify one or more second least reliable samples within the second subset. The FEC device may also, or alternatively, merge the first samples and the second samples to create a first merged subset that includes fewer samples than are included within the first subset or the second subset. The FEC device may discard the first subset and/or the second subset. Additionally, or alternatively, the FEC device may select a third subset of the encoded word and may identify one or more third least reliable samples within the third subset. The FEC device may also, or alternatively, merge the third least reliable samples and one or more least reliable samples selected from the first merged subset to create a second merged subset. The second merged subset may include fewer samples than the first merged subset or the third subset. The FEC device may discard the first merged subset and/or the third subset.

Additionally, or alternatively, the FEC device may select one or more least reliable samples from the second merged subset and may use the selected least reliable samples to process the encoded word. When two or more least reliable samples, within the first merged subset, correspond to a same reliability value, there may be an equal probability that the FEC device selects a least reliable sample, of the two or more least reliable samples, associated with the first subset or the second subset. When two or more least reliable samples, within the second merged subset, correspond to a same reliability value, there may be less probability that the FEC device selects a least reliable sample associated with the third subset than a least reliable sample associated with the first merged subset. The lesser probability may have an effect of creating an equal probability that the FEC device will select a least reliable sample associated with the first subset, the second subset, or the third subset, when the two or more least reliable samples, within the second merged subset, correspond to the same reliability value. The equal probability associated with selecting the least reliable samples from the first merged subset or the second merged subset may allow the FEC device to process the encoded word without introducing the processing bias.

FIG. 1 is a diagram of an example network 100 in which systems and/or methods described herein may be implemented. Network 100 may include a pair of client devices 105-1 and 105-2 (hereinafter referred to, in some instances, as "client device 105"), an optical transmitter 110, a link 115, an optical receiver 120, and a forward error correction (FEC) device 130. The number of devices, illustrated in FIG. 1, is provided for explanatory purposes. In practice, there may be additional devices, fewer devices, different devices, or differently arranged devices than illustrated in FIG. 1. Also, in some implementations, one or more of the devices of network 100 may perform one or more functions described as being performed by another one or more of the devices of network 100. For example, functions performed by FEC device 130 could be performed by optical receiver 120 instead of, or in combination with, some other device.

Client device 105 may include a computation and communication device that is capable of communicating with optical transmitter 110, optical receiver 120, and/or FEC device 130. For example, client device 105 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a server device, a laptop computer, a tablet computer, a set top box, a digital video recorder (DVR), a personal gaming system, a smart phone, or another type of computation or communication device.

Client device 105-1 may, for example, transmit, to optical transmitter 110, a client signal that includes a stream of packets that carry payload (e.g., a message, video, audio, a document, etc.), associated with client device 105-1. Optical transmitter 110 may provide the client signal to optical receiver 120. Alternatively, or additionally, client device 105-2 may communicate with FEC device 130 to receive the client signal that has been processed, by optical receiver 120 and/or FEC device 130, to detect and/or correct errors within the client signal. Client device 105-2 may receive the client signal directly from FEC device 130 and/or indirectly from FEC device 130, such as via optical receiver 120.

Optical transmitter 110 may include one or more devices that generate and/or transmit an optical signal to optical receiver 120. Optical transmitter 110 may, in an example implementation, include one or more lasers that generate one or more optical signals. Alternatively, or additionally, optical transmitter 110 may include a modulator that modulates the one or more optical signals based on one or more input electrical signals, such as client signals received from client devices 105. In this example, optical transmitter 110 may modulate the optical signals using one or more modulation techniques (e.g., phase modulation, frequency modulation, amplitude modulation, polarization modulation, and/or other modulation techniques).

Alternatively, or additionally, optical transmitter 110 may include an encoding device that encodes payload bits that are included within a client signal received from client device 105-1. Optical transmitter 110 may encode the payload bits using a forward error correction code (e.g., a Bose, Ray-Chaudhuri (BCH) code, and/or some other type of error correction code). Optical transmitter 110 may also, or alternatively, iteratively encode rows and/or columns of payload bits as a block and/or a frame of a fixed quantity of encoded payload bits to be described in greater detail below with respect to FIG. 3. Each encoded row and/or column may include encoded payload bits (sometimes referred to as "product codes") and error identification and/or correction bits associated with the product codes within the rows.

Alternatively, or additionally, optical transmitter 110 may include a multiplexer to multiplex the modulated optical signals (e.g., using wavelength-division multiplexing (WDM)) into an optical signal, associated with different wavelengths, for transmission to optical receiver 120.

Link 115 may include one or more devices and/or mechanisms to allow an optical signal to be transported to optical receiver 120. Link 115 may, in one example, include one or more optical fibers and/or fiber optic cables that allow the optical signal to be transported from optical transmitter 110 to optical receiver 120.

Optical receiver 120 may include one or more devices that receive, convert, process, amplify, and/or demodulate optical and/or electrical signals in a manner described herein. Optical receiver 120, in one implementation, may include one or more polarization beam splitting (PBS) devices that split the optical signal into one or more optical signals associated with different polarizations (e.g., a transverse magnetic (TM) polarization, a transverse electric (TE) polarization, etc.). Alternatively, or additionally, optical receiver 120 may include a demultiplexer device that demultiplexes a multi-wavelength optical signal (e.g., using wavelength-division demultiplexing techniques), received from optical transmitter 110, into multiple optical signals associated with different wavelengths. Alternatively, or additionally, optical receiver 120 may include one or more demodulators that convert the optical signals into electrical signals on which optical receiver 120 can perform signal processing. Alternatively, or additionally, optical receiver 120 may include an analog-to-digital converter to convert analog signals to digital signals, while preserving enough analog information to allow the reliability of the signal to be estimated.

Optical receiver 120, in one example, may include a signal processing device that processes an electrical signal by inserting reliability bits into a stream of encoded samples (e.g., that includes encoded payload bits and/or bits associated with error identification and/or correction), included within the electrical signal. Optical receiver 120 may generate one or more reliability bits, associated with each sample, based on a determination of a respective level of reliability of each encoded payload bit within each sample.

Optical receiver 120 may, for example, determine an amplitude (e.g., based on a power level, a voltage level, etc.), of an encoded payload bit within a sample. Optical receiver 120 may also, or alternatively, determine that the amplitude is greater than a first threshold (e.g., +1 volt, +3 volts, etc.). When the amplitude is greater than the first threshold, optical receiver 120 may insert, into the sample, reliability bits associated with a first level of reliability (e.g., a first reliability value of +3 or some other first reliability value) for a bit likely to be a logical mark associated with a first value (e.g., a value of 1 or some other first value). The reliability bits may, for example, be encoded in two's complement notation as (0, 1, 1, where the left-most bit (0) represents the positive sign of the reliability value and the other bits (1, 1) represent the reliability value of 3).

Alternatively, or additionally, optical receiver 120 may determine that the amplitude is less than a second threshold (e.g., −1 volt, −3 volts, etc.). When the amplitude is less than the second threshold, optical receiver 120 may insert, into the sample, reliability bits that correspond to the first level of reliability (e.g., represented by a second reliability value of −3 or some other second reliability value) for a bit likely to have been transmitted as a logical space associated with a second value (e.g., a value of 0 or some other second value). The reliability bits may, in this example, be encoded in two's complement notation as (1, 0, 1, where left-most bit (1) represents the negative sign of the reliability value and the other bits (0, 1) represent the reliability value).

Alternatively, or additionally, optical receiver 120 may determine that the amplitude, is less than a third threshold (e.g., 0.25 volts, or some other value) and is greater than a fourth threshold (e.g., −0.25 volts, or some other value). When the amplitude is less than the third threshold and greater than the fourth threshold, optical receiver 120 may insert, into the sample, reliability bits that correspond to a second level of reliability (e.g., a third reliability value of 0 or some other third reliability value). The reliability bits may, in this example, be encoded in two's complement notation as (0, 0, 0).

Optical receiver 120 may insert, into the sample, other reliability bits associated with one or more third levels of reliability that are less than the first level of reliability and greater than the second level of reliability (e.g., +2, +1, etc.), for positive amplitudes that are less than the first threshold and greater than the third threshold. Additionally, or alternatively, optical receiver 120 may insert, into the sample, other reliability bits associated with one or more third levels of reliability (e.g., −2, −1, etc.), for negative amplitudes that are greater than the second threshold and less than the fourth threshold. Optical receiver 120 may output, to FEC device 130, an electrical signal that includes a stream of samples that identify levels of reliability (e.g., based on the reliability bits) of payload bits included within the samples.

FEC device 130 may include one or more devices that receive, process, and/or perform other operations on the electrical signals, received from optical receiver 120, in a manner described herein. FEC device 130 may receive electrical signals from optical receiver 120 and may perform a FEC operation on the electrical signal to identify and/or correct errors within the electrical signal and/or to remedy a condition, associated with the electrical signal, caused by the identified errors.

Figure 2:
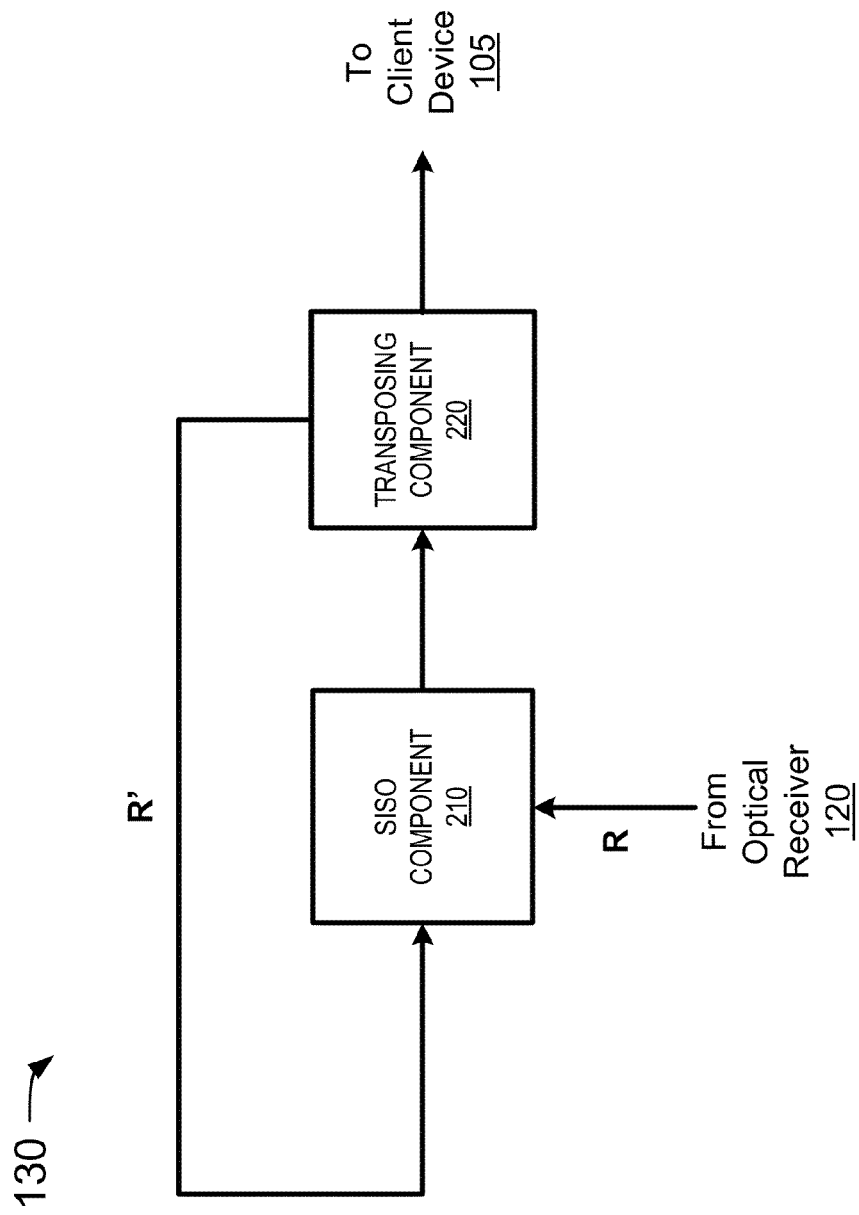
FIG. 2 is a diagram of example components of an error correction device of FIG. 1.

FIG. 2 is a diagram of example components of FEC device 130. As illustrated in FIG. 2, FEC device 130 may include a collection of components, such as a soft-input-soft-output (SISO) component 210 and a transposing component 220. Although FIG. 2 shows example components of FEC device 130, in other implementations, FEC device 130 may contain fewer components, additional components, different components, or differently arranged components than depicted in FIG. 2. Alternatively, or additionally, one or more of the components of FEC device 130 may perform one or more functions described as being performed by another one or more of the components of FEC device 130.

SISO component 210 may include one or more components that receive, process, and/or perform operations on an electrical signal, received from optical receiver 120, in a manner described herein. SISO component 210 may, for example, receive a block (or a frame) of a fixed quantity of samples from optical receiver 120 (e.g., shown as R) and may perform a soft, iterative forward error correction operation on the block of samples. In one example, SISO component 210 may perform the operation on one or more encoded words based on one or more rows and/or columns of samples obtained from the block of samples. Additionally, or alternatively, SISO component 210 may output, to transposing component 220, the encoded words on which the operation was performed. Transposing component 220 may transpose the rows and columns of the encoded words and may output, to SISO component 210, a processed block of samples (e.g., shown as R') based on transposing the rows and columns of the encoded words.

For example, SISO component 210 may divide an encoded word into segments. Each segment may include a different subset of samples included within the encoded word. SISO component 210 may also, or alternatively, select a subset of samples and may sort the samples, included within the selected subset, based on respective reliability values associated with each of the samples. SISO component 210 may select one or more of the samples associated with a lowest reliability value (sometimes referred to herein as "least reliable samples (LRSs)").

Additionally, or alternatively, SISO component 210 may create a first merged subset of samples that includes the selected LRSs and other LRSs selected from one or more other subsets associated with the encoded word. SISO component 210 may also, or alternatively, select one or more LRSs from the first merged subset of samples. In one example, SISO component 210 may use the selected LRSs to process the encoded word to identify and/or correct errors associated with the encoded word. Additionally, or alternatively, SISO component 210 may merge the first merged subset with LRSs selected from one or more further subsets, associated with the encoded word, to create a second merged subset. In this example, SISO component 210 may use one or more LRSs, selected from the second merged subset, to process the encoded word to identify and/or correct errors associated with the encoded word.

SISO component 210 may also, or alternatively, perform another iteration using the processed block of samples (e.g., corresponding to R') and the original block of samples (e.g., corresponding to R) to generate another processed block of samples (e.g., R') that includes fewer errors than the processed block of samples. SISO component 210 may perform the iterations by alternating between rows and columns and/or based on some other pattern of processing. SISO component 210 may, for each iteration, dynamically adjust a reliability value, associated with each sample, to cause the quantity of errors to decrease, with each successive iteration, until the operation converges (e.g., when all the errors are corrected).

Transposing component 220 may include one or more components that allow samples associated with the block of samples to be stored, retrieved, and/or transposed. In an example implementation, transposing component 220 may include a memory that stores the block of samples within rows and/or columns associated with a forward error correction frame. Transposing component 220 may write samples to the rows and/or columns and/or may read samples from the rows and/or columns. Transposing component 210 may also, or alternatively, cause a sample, that is stored at a first location within the memory that corresponds to a position within a row, to be read from the first location and written to a second location, within the memory, that corresponds to a position within a column. Additionally, or alternatively, transposing component 210 may also, or alternatively, cause another sample, that is stored at a third location within the memory that corresponds to another position within a column, to be read from the third location and written to a fourth location, within the memory, that corresponds to another position within a row.

Figure 3:
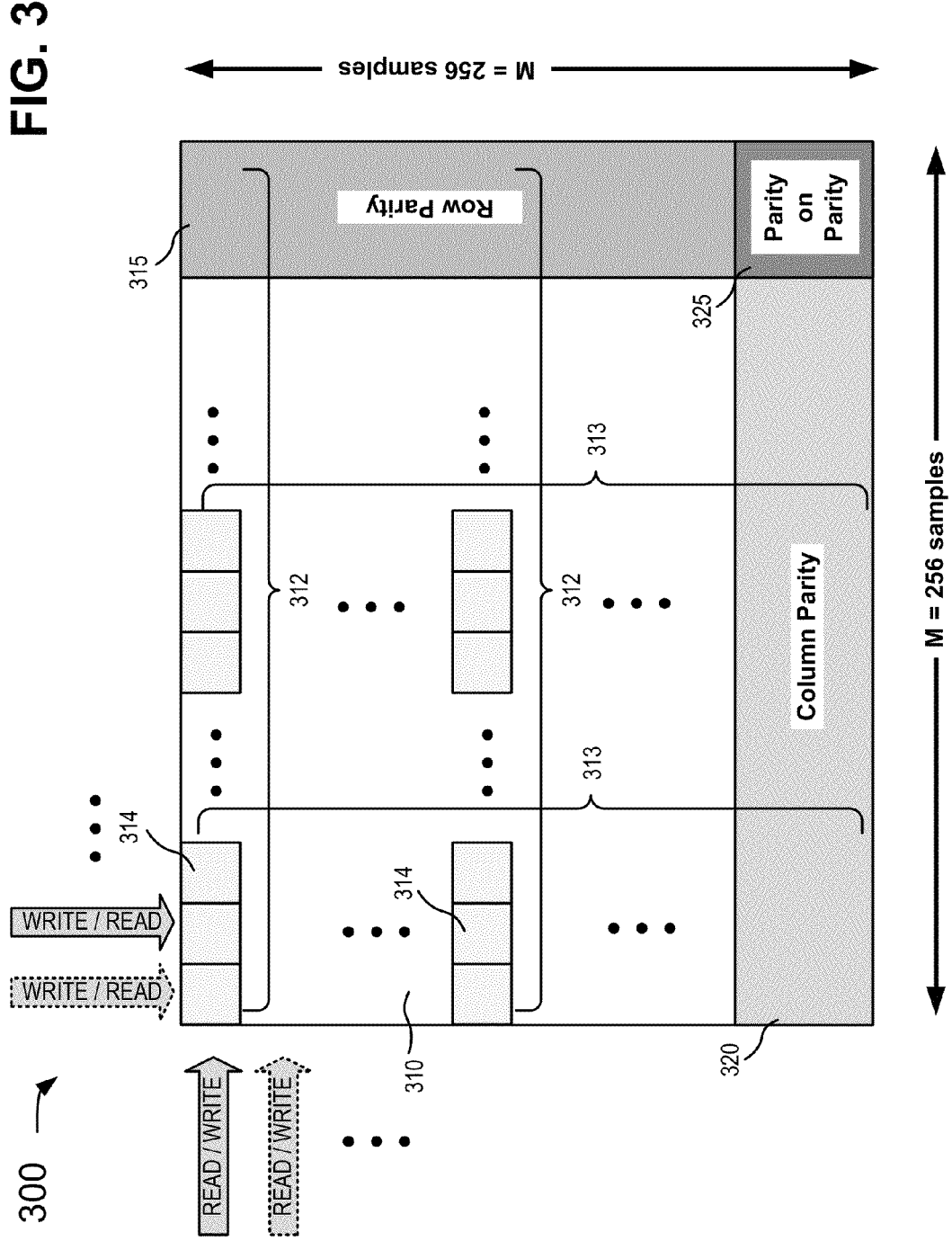
FIG. 3 is a diagram of an example data structure that stores encoded words according to an implementation described herein.

FIG. 3 is a diagram of an example data structure 300 that stores encoded words according to an implementation described herein. In one example, data structure 300 may be stored in a memory associated with FEC device 130. Additionally, or alternatively, data structure 300 may be stored in a memory associated with optical receiver 120. As shown in FIG. 3, data structure 300 may include an encoded word field 310, a row parity field 315, a column parity field 320, and/or a parity on parity field 325. The quantity of fields, within data structure 300, are included for explanatory purposes. Additionally, or alternatively, there may be additional fields, fewer fields, different fields, or differently arranged fields than are shown with respect to data structure 300.

Encoded word field 310 may store encoded words 312 in horizontal rows and/or encoded words 313 in vertical columns. Encoded words 312 and/or encoded words 313 may be generated, by optical transmitter 110, based on a signal received from client device 105 and iterative forward error correction encoding by optical transmitter 110 (e.g., using a forward error correction code). Optical transmitter 110 may transmit an optical signal, that includes encoded words 312 and/or encoded words 313, to optical receiver 120. Optical receiver 120 may receive the optical signal and may store encoded words 312 and/or encoded words 313 in encoded word field 310. Each encoded word 312 and/or encoded word 313 may include a group of samples 314.

Each Sample 314 may include one or more payload bits associated with a client signal, one or more bits used for error identification and/or correction, and/or one or more reliability bits that identify a level of reliability associated with the payload bits. A quantity of samples 314, associated with encoded word 312 and/or encoded word 313, may be predetermined based on capacities of horizontal rows and/or vertical columns, respectively, of data structure 300. Optical receiver 120 may associate the reliability bits with samples 314 in a manner similar to that described above with respect to FIG. 1. Optical receiver 120 may transmit samples 314 to FEC device 130.

By way of example, FEC device 130 may horizontally write samples 314 to a row as encoded word 312. A different encoded word 312 may be horizontally written to each row (e.g., as shown by the right-pointing arrows labeled as "read/write") until data structure 300 has reached capacity. Alternatively, or additionally, FEC device 130, may vertically write samples 314 to a column as encoded word 313. A different encoded word 313 may be written to each column (e.g., as shown by the down-pointing arrows labeled as "read/write") until data structure 300 has reached capacity. Encoded words 312 may also, or alternatively, be read from the rows and processed by FEC device 130, and the processed encoded words 312 may be written to the rows. Additionally, or alternatively, encoded words 313 may be read from the columns and processed by FEC device 130, and the processed encoded words 313 may be written to the columns.

Row parity field 315, may store error correction bits that can be used, by FEC device 130, to decode encoded words 312 on an iterative basis. Column parity field 320 may store other error correction bits that can be used, by FEC device 130, to decode encoded words 313 on an iterative basis. For example, the error correction bits, stored within row parity fields 315 and/or column parity field 320, may be generated by optical transmitter 110 and inserted into an optical signal for transmission to optical receiver 120. Optical receiver 120 may receive the optical signal and may cause the error correction bits to be stored in row parity field 315 and/or column parity field 320. FEC device 130 may use the error correction bits to identify and/or correct errors within encoded words 312 and/or 313.

Parity on parity field 325 may store error correction bits that allow the error correction bits within row parity field 315 and/or column parity field 320 to be decoded and/or checked for errors. For example, the error correction bits, stored within parity on parity field 325, may be generated by optical transmitter 110 and inserted into the optical signal for transmission to optical receiver 120. Optical receiver 120 may receive the optical signal and may cause the error correction bits to be stored in parity on parity field 325. FEC device 130 may use the error correction bits to identify and/or correct errors within row parity field 315 and/or column parity field 320.

In an example implementation, data structure 300 may be sized to conform to a block of samples 314 and/or a forward error correction frame of samples 314. In one example, data structure 300 may include 256 rows and 256 columns (e.g., 256×256) and may store encoded words 312 in 247 rows (e.g., rows 0 through 246) and error correction bits, associated with column parity field 320, in the remaining rows (e.g., rows 247 through 255). Additionally, or alternatively, data structure 300 may store encoded words 313 within 247 columns (e.g., columns 0 through 246) and error correction bits, associated with row parity field 315, in the remaining columns (e.g., columns 247 through 255).

While the description below describes a soft iterative forward error correction operation in the context of a 256×256 data structure, such as data structure 300, for explanatory purposes, in other implementations, for example, the soft iterative forward error correction operation could be performed using a data structure with a quantity of rows and/or columns that are different from 256×256.

Figure 4:
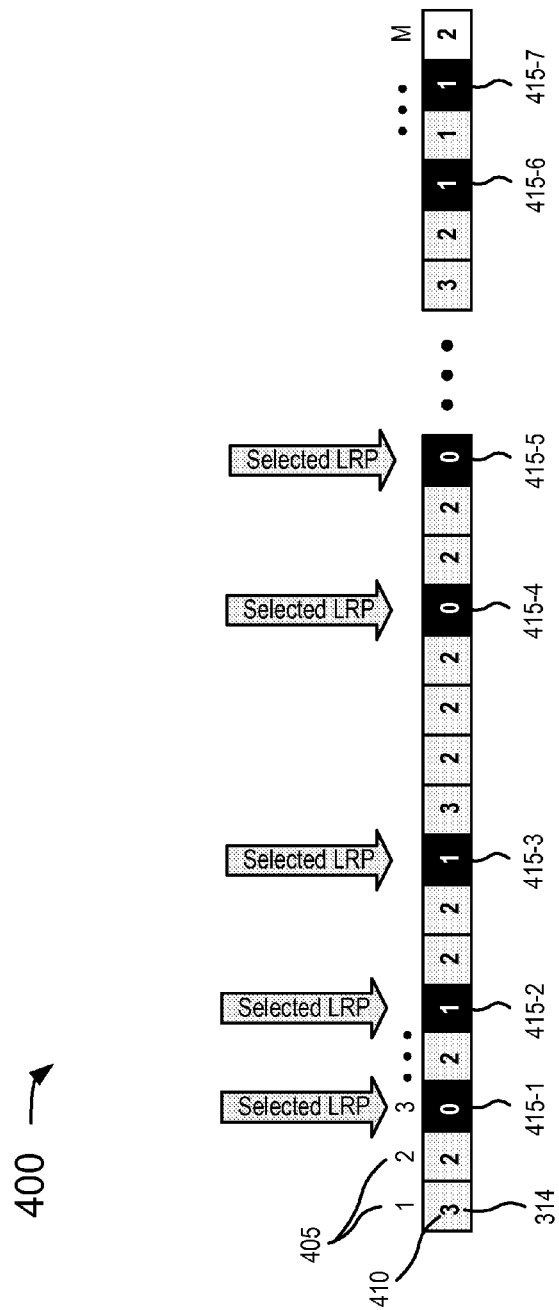
FIG. 4 is a diagram of an example encoded word that may be stored in the example data structure of FIG. 3.

FIG. 4 is a diagram of an example encoded word 400 stored in data structure 300 of FIG. 3. Encoded word 400 may correspond to encoded word 312 and/or encoded word 313 of FIG. 3. Encoded word 400 may include a collection of samples 314 (FIG. 3), a set of bit positions 405 (hereinafter referred to collectively as "positions 405" and individually as "position 405"), a set of reliability values 410 (hereinafter referred to collectively as "reliability values 410" and individually as "reliability value 410"), and a collection of least reliable positions (LRPs) 415-1, . . . , 415-7 (hereinafter referred to collectively as "LRPs 415"). The quantity of positions, values, and/or samples within encoded word 400 are included for explanatory purposes. In another implementation, there may be additional positions, values, and/or samples; fewer positions, values, and/or samples; different positions, values, and/or samples; and/or differently arranged positions, values, and/or samples than are shown in FIG. 4.

Position 405 may identify a position, within encoded word 400, relative to a particular sample 314 associated with encoded word 400. For example, a first sample 314 (e.g., a left most sample 314) may correspond to a first position 405 (e.g., shown as 1); a second sample 314, within encoded word 400, may correspond to a second position 405 (e.g., shown as 2); a last sample 314 (e.g., a right most sample 314) may correspond to a last position 405 (e.g., shown as M, where M≥1); etc.

Reliability value 410 may identify a level of reliability associated with the particular sample 314 and/or an encoded payload bit associated with the particular sample 314. For example, reliability value 410 may, in a manner similar to that described above with respect to FIG. 1, correspond to a level of reliability identified by one or more reliability bits associated with the particular sample 314. For example, sample 314 may, in a manner similar to that described above with respect to FIG. 3, include one or more reliability bits that identify a level of reliability of an encoded payload bit within sample 314. A first reliability value 410 (e.g., 3) may correspond to a highest level of reliability of a payload bit. A second reliability value 410 (e.g., 0) may correspond to a lowest level of reliability of a payload bit. A third reliability value 410 (e.g., 1 or 2) may correspond to one or more levels of reliability, of a payload bit, that is higher than the lowest level of reliability and lower than the highest level of reliability. Reliability values 410 are described herein as including only positive values (e.g., between 0 and +3) for simplicity. In one example, reliability values 410 may be represented as an absolute value of reliability values 410 that include positive and/or negative values (e.g., +3 and/or −3, +2 and/or −2, +1 and/or −1, 0, etc.). In another example, reliability values 410 may not be represented as an absolute value and may include positive and/or negative values.

LRP 415 may correspond to a particular sample 314 that includes reliability value 410 that is among the lowest reliability values 410 within encoded word 400. For example, FEC device 130 may sort samples 314 based on reliability values 410, associated with samples 314, to identify a sorted set of reliability values 410 (e.g., {0, 0, 0, 1, 1, 1, 1, . . . , 2, 2, 2, . . . , 3, 3, 3, . . . }). FEC device 130 may also, or alternatively, identify samples 314 associated with the lowest reliability values 410 based on the sorted set of reliability values 410. Additionally, or alternatively, FEC device 130 may identify, as LRPs 415 (e.g., shown as shaded blocks labeled 415-1 through 415-7), samples 314 with the lowest reliability values 410 (e.g., {0, 0, 0, 1, 1, 1, 1}). FEC device 130 may select one or more of the identified LRPs 415 and may use the selected LRPs 415 to process encoded word 400. The quantity of selected LRPs 415 (e.g., N) may be predetermined by FEC device 130 and/or an operator of FEC device 130.

In one example, a portion of the identified LRPs 415 may be selected and another portion of the identified LRPs 415 may not be selected. For example, a conventional FEC device may select a set of LRPs 415 (e.g., LRPs 415-1 through 415-5 as shown by the arrows labeled as "Selected LRP") associated with a first portion of the sorted set of reliability values 410 (e.g., {0, 0, 0, 1, 1} when N=5). Additionally, or alternatively, the conventional FEC device may not select one or more other LRPs 415 (e.g., LRPs 415-6 and 415-7) associated with a second portion of the sorted set of reliability values 410 (e.g., {1, 1}). In this example, a conventional FEC device, may select earlier occurring LRPs 415 (e.g., left-most LRPs 415 when samples 314 are sorted from left to right) within encoded word 400 and may not select later occurring LRPs 415 (e.g., right-most LRPs 415) when the predetermined quantity of LRPs 415 have been selected. Selecting the earlier-occurring LRPs 415 may introduce a processing pattern that disfavors selection of LRPs 415 in a portion of encoded word 400 (e.g., in later occurring samples 314). The processing pattern may introduce a processing bias that may reduce a quantity of errors that can be corrected by a conventional FEC device and/or increase a processing time associated with processing errors within encoded word 400.

FEC device 130 may remove the processing bias by randomly selecting LRPs 415 identified within encoded word 400. The random selection may not allow a processing pattern to exist that favors selection of LRPs 415, occurring in one portion of encoded word 400, over other LRPs 415 occurring in another portion of encoded word 400. Removing the processing bias may increase a quantity of errors that can be corrected by FEC device 130 relative to a conventional FEC device. Additionally, or alternatively, removing the processing bias may decrease a processing time associated with processing errors within encoded word 400.

Figure 5:
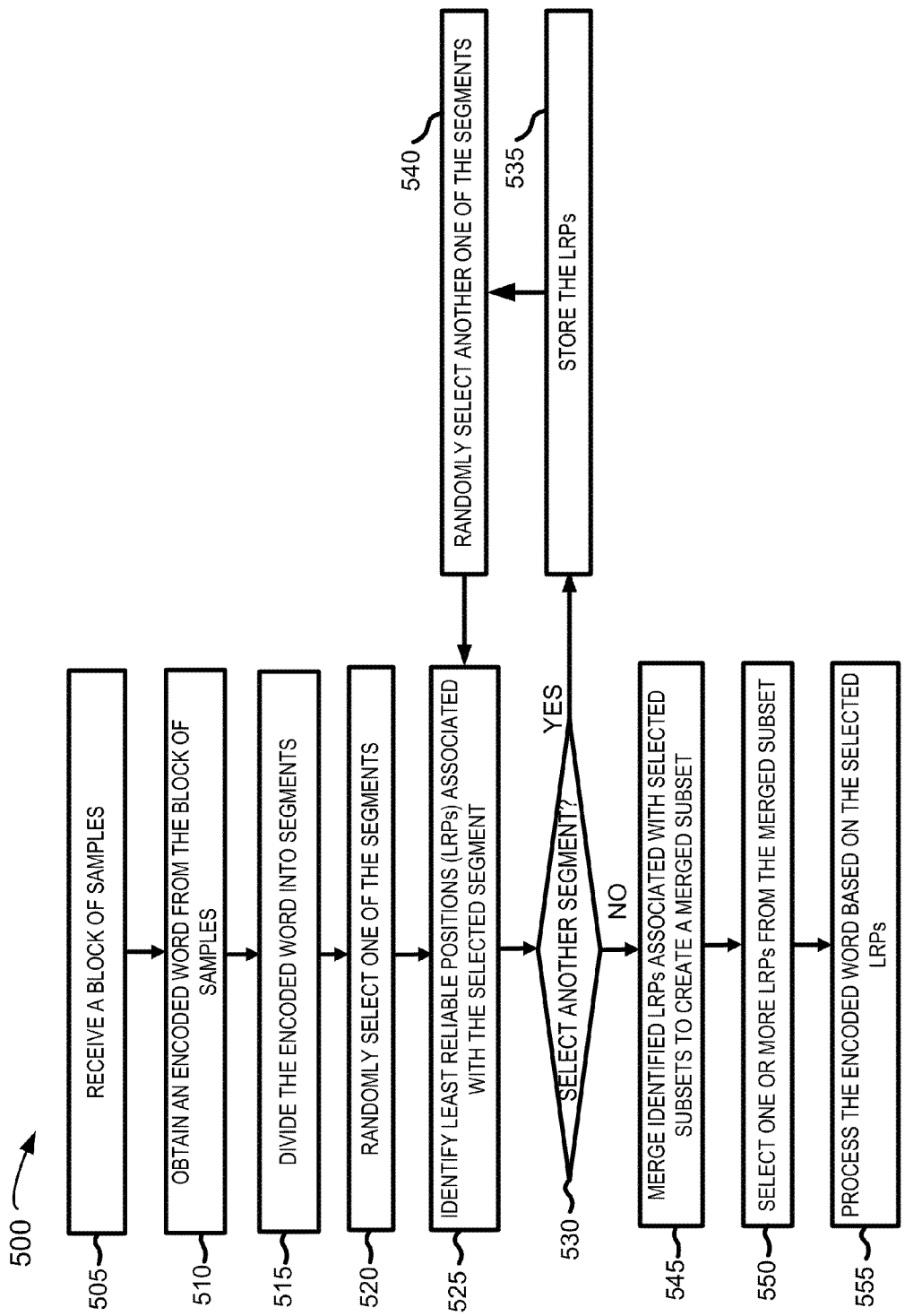
FIG. 5 is a flow chart of an example process for processing an encoded word based on a randomized partial sort and single merge scheme.
Figure 6:
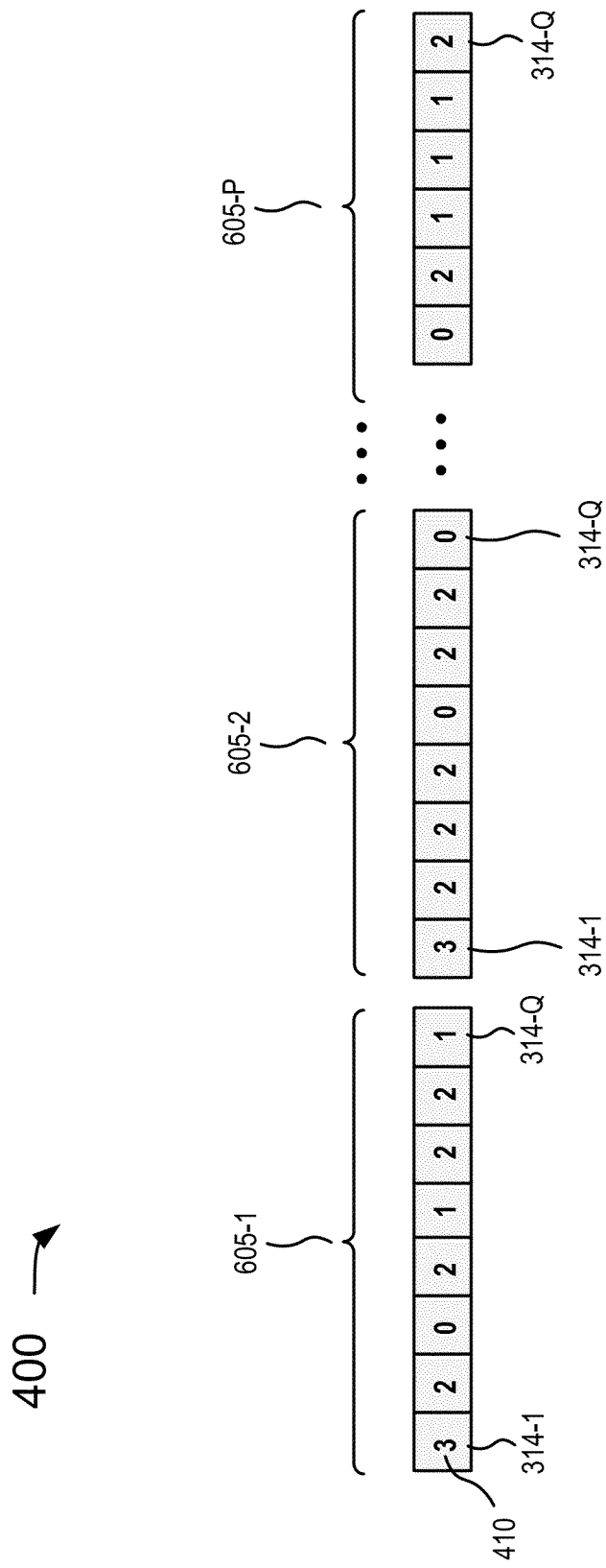
FIG. 6 is a diagram of an example encoded word that has been segmented into subsets of samples associated with the encoded word.
Figure 7:
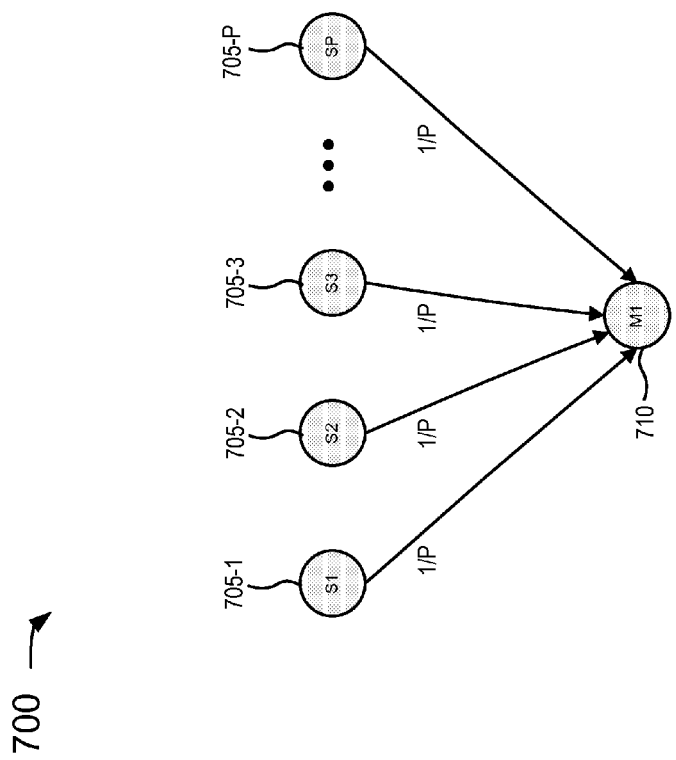
FIG. 7 is a diagram of an example a randomized partial sort and single merge scheme for processing an encoded word.

FIG. 5 is a flow chart of an example process 500 for processing an encoded word based on a randomized partial sort and single merge scheme. In an example implementation, process 500 may be performed by FEC device 130. Alternatively, or additionally, some or all of process 500 may be performed by a device or collection of devices separate from, or in combination with, FEC device 130. FIG. 6 is a diagram of an example encoded word 400 that has been segmented into subsets of samples associated with the encoded word. FIG. 7 is a diagram of an example a randomized partial sort and single merge scheme 700 (hereinafter referred to as "processing scheme 700") for processing an encoded word. In the description below, some or all of process 500 will be described with references to encoded word 400 of FIG. 6 and processing scheme 700 of FIG. 7.

As shown in FIG. 5, process 500 may include receiving a block of samples (block 505) and obtaining an encoded word from the block of samples (block 510). For example, FEC device 130 may receive, from optical receiver 120, a block of samples 314. Each sample 314 may include one or more reliability bits, that identify a level of reliability of the encoded payload bits, associated with samples 314 within the encoded word. FEC device 130 may obtain, from the block of samples 314, a row of samples that represents an encoded word. Additionally, or alternatively, FEC device 130 may obtain an encoded word from a column of samples 314 within the block of samples 314.

As also shown in FIG. 5, process 500 may include dividing the encoded word into segments (block 515) and randomly selecting one of the segments (block 520). For example, FEC device 130 may divide the encoded word into segments that include subsets of samples 314 associated with the encoded word. Each of the segments may include a different subset of samples 314. For example, as shown in FIG. 6, encoded word 400 may be divided into a group of segments 605-1, ..., 605-P (where P≥1) (hereinafter referred to collectively as "segments 605" and individually as "segment 605"). Segment 605 may include a subset of samples 314-1, ..., 314-Q (where Q≥1). Additionally, or alternatively, each segment 605 may include a different subset of samples 314. A quantity of samples 314 (e.g., represented by Q), associated with segment 605, may be predetermined by FEC device 130 and/or by an operator of FEC device 130. Encoded word 400 may be divided into a quantity of segments 605. For example, the quantity of segments 605, into which encoded word 400 is divided, may be based on a quantity of samples 314 included within encoded word 400 (e.g., represented by M) divided by the quantity of samples 314 associated with segment 605 (e.g., P≈M/Q).

Returning to FIG. 5, FEC device 130 may randomly select one of the segments. For example, FEC device 130 may obtain a random value (e.g., by generating the random value or retrieving a random value from another device) and may use the random value to select one of the segments. The random value may permit FEC device 130 to select the segment in a random manner so that a processing bias is avoided. In one example, FEC device 130 may select a first segment (e.g., segment 605-1) when an even random value is obtained and/or may select a last segment (e.g., segment 605-P) when an odd random value is obtained. Additionally, or alternatively, FEC device 130 may obtain a random value that falls within a range corresponding to the segments (e.g., between 1 and P) and may select a segment to which the random number corresponds. For example, FEC device 130 may obtain a random number (e.g., 3) that falls within the range and may select a segment that corresponds to the random number (e.g., a third segment 605-3).

As further shown in FIG. 5, process 500 may include identifying least reliable positions (LRPs) associated with the selected segment (block 525). For example, FEC device 130 may, in a manner similar to that described above with respect to FIG. 4, analyze reliability values 410 associated with samples 314 included within the selected segment. FEC device 130 may also, or alternatively, identify which samples 314 are associated with lowest reliability values 410. In one example, FEC device 130 may sort samples 314, based on reliability values 410 (e.g., from lowest to highest, highest to lowest, etc.), to identify lowest reliability values 410. FEC device 130 may select, as one or more LRPs 415, a predetermined quantity of samples 314 (e.g., represented by N') associated with lowest reliability values 410. Each of the selected LRPs 415 may correspond to a respective position within the selected segment.

If another segment is to be selected (block 530-YES), then process 500 may include storing the LRPs (block 535), randomly selecting another one of the segments (block 540), and identifying LRPs associated with the other one of the segments (block 545). For example, FEC device 130 may determine that one or more other segments, associated with the encoded word, have not been selected and/or processed. When the other segments have not been selected and/or processed, FEC device 130 may store, in a memory associated with FEC device 130, the LRPs 415 associated with the selected segment.

Additionally, or alternatively, FEC device 130 may select another segment associated with the encoded word. In one example, FEC device 130 may select a next segment that is adjacent to the selected segment. For example, when the selected segment corresponds to a first segment (e.g., segment 605-1 of FIG. 6), FEC device 130 may select a second segment (e.g., segment 605-2 of FIG. 6) that is adjacent to the first segment. Additionally, or alternatively, when the selected segment corresponds to a last segment (e.g., segment 605-P of FIG. 6), FEC device 130 may select a next to last segment (e.g., segment 605-(P−1)) that is adjacent to the last segment. Additionally, or alternatively, FEC device 130 may obtain another random value that falls within a range of segments (e.g., between 1 and P) and may select another segment that corresponds to the other random number and/or that has not already been used to select a segment. Additionally, or alternatively, FEC device 130 may, in a manner similar to that described above, analyze reliability values 410, associated with a subset of samples 314, within the other segment. FEC device 130 may select, as one or more LRPs 415, one or more samples 314, associated with the lowest reliability values 410, within the other segment. Each LRP 415 may correspond to a respective position within the other segment.

Additionally, or alternatively, FEC device 130 may store the LRPs 415 and may select one or more further segments, associated with the encoded word, until all segments, associated with the encoded word, are selected. FEC device 130 may also, or alternatively and in a manner similar to that described above, process the further segments to identify LRPs 415 associated with the further segments. FEC device 130 may also, or alternatively, store LRPs 415 associated with the further segments.

If another segment is not to be selected (block 530-NO), then process 500 may include merging LRPs, associated with the selected subsets, to create a merged subset (block 545). For example, FEC device 130 may create a merged subset of samples 314 that include LRPs 415 selected from each of the selected segments. The merged subset may include an equal quantity of LRPs 415 (e.g., N') from each of the selected subset. The equal quantity of LRPs 415, from each subset, may allow LRPs 415, within the merged subset, to be processed in a manner that avoids introducing a processing bias that favors any segment over any other segment associated with the encoded word.

For example, processing scheme 700 of FIG. 7 may include a collection of subsets 705-1, . . . , 705-P (where P≥1) (hereinafter referred to collectively as "subsets 705" and individually as "subset 705") and a merged subset 710. The quantity of subsets in processing scheme 700 are provided for explanatory purposes. In another implementation, there may be additional subsets, fewer subsets, different subsets, or differently arranged subsets than are shown in FIG. 7.

Subset 705 may store a subset of samples 314 associated with a particular segment (e.g., segment 605 of FIG. 6) of an encoded word. For example, a first subset 705 (e.g., subset 705-1) may correspond to a first segment (e.g., segment 605-1) of an encoded word. First subset 705 may, thus, store a first subset of samples 314 associated with the first segment; a second subset 705 (e.g., subset 705-2) may store a second subset of samples 314 associated with a second segment (e.g., segment 605-2 of FIG. 6) of the encoded word; a last subset 705 (e.g., subset 705-P) may store a last subset of samples 314 associated with a last segment (e.g., segment 605-P of FIG. 6) of the encoded word; etc.

Merged subset 710 may store LRPs 415 selected from each subset 705. For example, merged subset 710 may store first LRPs 415 associated with first subset 705; second LRPs 415 associated with second subset 705; last LRPs 415, associated with last subset 705; etc. Merged subset 710 may, thus, include an equal quantity of LRPs 415 from each of subsets 705. Stated another way, a probability that merged subset 710 stores a LRP 415, associated with any one of subsets 705, is equal to a probability that merged subset 710 stores another LRP 415 associated with any other subset 705. The equal probability (e.g., shown as 1/P in FIG. 7) may be based on a quantity of subsets 705 and/or segments 605 and/or may indicate that a processing bias is not associated with processing scheme 700.

Returning to FIG. 5, process 500 may include selecting one or more LRPs from the merged subset (block 550) and processing the encoded word based on the selected LRPs (block 555). For example, FEC device 130 may randomly select LRP 415 from a set of LRPs 415 associated with the merged subset. FEC device 130 may, for example, obtain (e.g., by generating or retrieving from another device) a random number and may select LRP 415 based on the random number. In one example, the random number may fall within a range that corresponds to a quantity of LRPs 415 associated with the merged subset. Thus, FEC device 130 may select a particular LRP 415 that corresponds to a particular random number.

Additionally, or alternatively, FEC device 130 may analyze reliability values 410, associated with LRPs 415 that are included within merged subset 710, to identify LRP 415 associated with a lowest reliability value 410. FEC device 130 may also, or alternatively, sort LRPs 415, within merged subset 710 and based on reliability values 410, to identify LRP 415 associated with the lowest reliability value 410. FEC device 130 may also, or alternatively, select LRP 415 associated with the lowest reliability value 410. When two or more LRPs 415 are associated with a same lowest reliability value 410, FEC device 130 may select one of the two or more LRPs 415 based on a random number using one or more of the techniques described above and/or some other technique.

FEC device 130 may use the selected LRP 415 to invert a value of a payload bit associated with the encoded word to create a candidate word. The payload bit may correspond to a position, within the encoded word, to which the selected LRP 415 corresponds. For example, FEC device 130 may cause a value, of a payload bit (e.g., −1), within the encoded word, to be inverted to another value (e.g., +1) based on the selected LRP 415. FEC device 130 may create a candidate word based on the other payload bits included within the encoded word and the inverted payload bit. Additionally, or alternatively, FEC device 130 may select one or more other LRPs 415 from the merged subset and may create other candidate words based on the other LRPs 415. FEC device 130 may, using known soft forward error correction techniques, use the candidate word and/or the other candidate words to identify a version of the encoded word that includes fewer errors than are included within the encoded word.

Additionally, or alternatively, FEC device 130 may process other encoded words, obtained from the block of samples, in a manner similar to that described above. FEC device 130 may also, or alternatively, continue to process the other encoded words until all of the encoded words, within the block of samples, have been processed.

Figure 8:
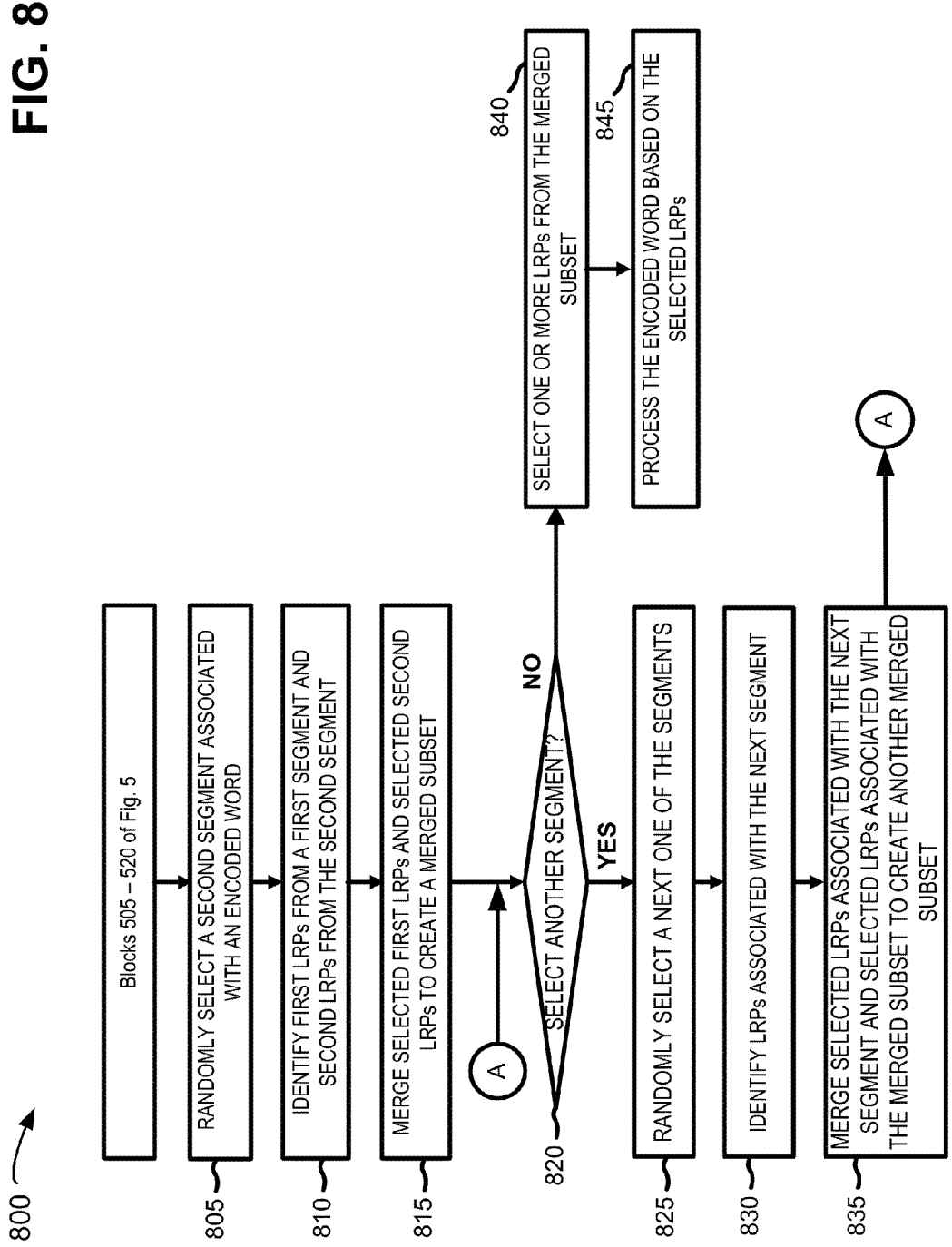
FIG. 8 is a flow chart of an example process for processing an encoded word based on a randomized partial sort and sequential merge scheme.
Figure 9:
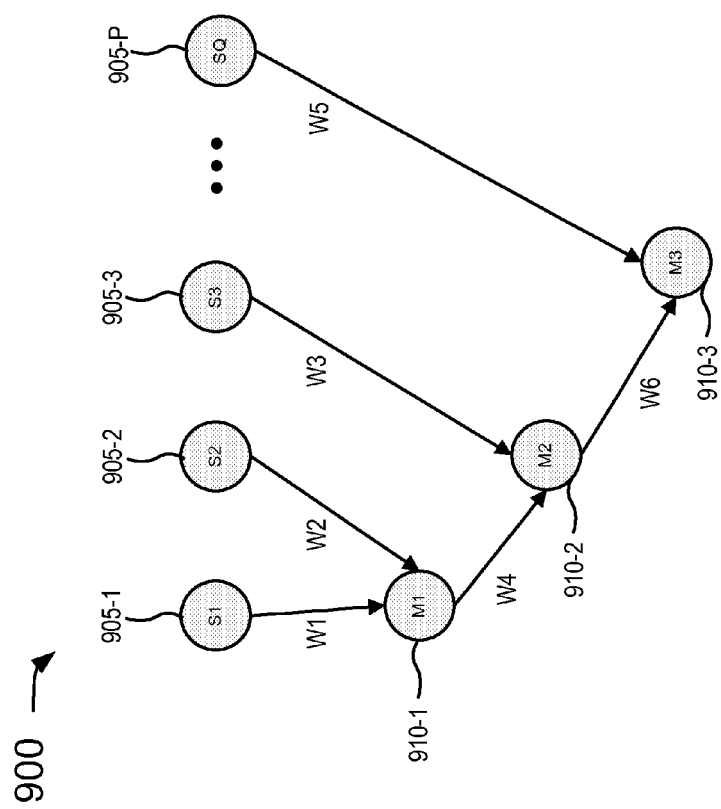
FIG. 9 is a diagram of an example randomized partial sort and sequential merge scheme for processing an encoded word.

FIG. 8 is a flow chart of an example process 800 for processing an encoded word based on a randomized partial sort and sequential merge scheme. In an example implementation, process 800 may be performed by FEC device 130. Alternatively, or additionally, some or all of process 800 may be performed by a device or collection of devices separate from, or in combination with, FEC device 130. FIG. 9 is a diagram of an example randomized partial sort and sequential merge scheme 900 (hereinafter referred to as "processing scheme 900") for processing an encoded word. In the description below, some or all of process 800 will be described with reference to processing scheme 900 of FIG. 9.

Assume, in the description below, that FEC device 130 receives a block of samples and obtains an encoded word, from the block of samples, in a manner similar to that described above with respect to blocks 505 and 510 of FIG. 5. Assume further that FEC device 130 divides the encoded word into segments, where each segment includes respective subsets of samples 314, in a manner similar to that described above with respect to block 515 of FIG. 5. Assume still further that FEC device 130 randomly selects one of the segments, as a first segment and that includes a first set of samples 314, in a manner similar to that described above with respect to block 520 of FIG. 5.

As shown in FIG. 8, process 800 may include randomly selecting a second segment associated with an encoded word (block 805) and identifying first LRPs from a first segment and second LRPs from the second segment (block 810). For example, FEC device 130 may, in a manner similar to that described above with respect to block 540 of FIG. 5, select a second segment from the segments associated with the encoded word. The second segment may include a second subset of samples 314. The second segment may, for example, correspond to a segment that is adjacent to the first segment. Alternatively, the second segment may correspond to a segment that is not adjacent to the first segment. Additionally, or alternatively, the second segment may, in a manner similar to that described above with respect to block 520 of FIG. 5, correspond to a segment that is randomly selected from the segments that have not yet been selected by FEC device 130.

Additionally, or alternatively, FEC device 130 may select first LRPs 415 associated with the first segment and may select second LRPs 415 associated with the second segment. For example, FEC device 130 may analyze the first subset of samples 314, based on first reliability values 410 associated with the first subset of samples 314. FEC device 130 may also, or alternatively, sort the first subset of samples 314 based on the first reliability values 410. FEC device 130 may identify the first LRPs 415 that are associated with lowest reliability values 410 based on analyzing and/or sorting the first subset of samples 314 based on the first reliability values 410. Similarly, FEC device 130 may identify second LRPs 415, associated with lowest reliability values 410 within the second set of samples 314, by analyzing and/or sorting the second subset of samples 314 based on the second reliability values 410. FEC device 130 may also, or alternatively, identify an equal quantity of first LRPs 415 and second LRPs 415 to avoid introducing a processing bias when processing the encoded word.

As also shown in FIG. 8, process 800 may include merging selected first LRPs and selected second LRPs to create a merged subset (block 815). For example, FEC device 130 may, in a manner similar to that described above with respect to block 545 of FIG. 5, select one, some, or all of the identified first LRPs 415 and/or one, some, or all of the identified second LRPs 415 and may create a first merged subset based on the first selected LRPs 415 and/or second selected LRPs 415.

For example, as shown in FIG. 9, processing scheme 900 may include a collection of subsets 905-1, . . . , 905-P (where P≥1) (hereinafter referred to collectively as "subsets 905" and individually as "subset 905") and a group of merged subset 910-1, . . . , 910-3 (hereinafter referred to collectively as "merged subsets 910" and individually as "merged subset 910"). The quantity of subsets in processing scheme 900 are provided for explanatory purposes. In another implementation, there may be additional subsets, fewer subsets, different subsets, or differently arranged subsets than are shown in FIG. 9.

Subset 905 may, in a manner similar to that described above with respect to subset 705 of FIG. 7, store a subset of samples 314 associated with a particular segment (e.g., segment 605 of FIG. 6) of an encoded word. Merged subset 910 may store samples 314 that are selected from among one or more subsets of samples 314 associated with one or more subsets 905.

For example, a first subset 905 (e.g., subset 905-1), may store a first subset of samples 314 and a second subset 905 (e.g., subset 905-2) may store a second subset of samples 314. The first subset of samples 314 may be sorted based on reliability values associated with samples 314 within first subset 905. First LRPs 415, associated with first subset 905, may be determined based on sorted samples 314 associated with reliability values that correspond to one or more lowest levels of reliability. Additionally, or alternatively, the second subset of samples 314 may be sorted based on reliability values associated with samples 314 within second subset 905. Second LRPs 415, associated with second subset 905, may be determined based on sorted samples 314 associated with reliability values that correspond to one or more lowest levels of reliability.

A first merged subset 910 (e.g., merged subset 910-1) may be created by merging and/or combining all or a portion of the first LRPs 415 with all or a portion of the second LRPs 415 to create a set of merged LRPs 415. Additionally, or alternatively, first merged subset 910 may be created by selecting samples 314 that correspond to a portion of the set of merged LRPs 415 that correspond to one or more lowest levels of reliability.

Returning to FIG. 8, FEC device 130 may select a portion of samples 314, associated with a merged set of LRPs 415 (e.g., merged from first LRPs 415 and second LRPs 415), that correspond to lowest levels of reliability. The selected portion of samples 314 may be included within first merged subset 910. In one example, FEC device 130 may determine that the merged set of LRPs 415 includes two or more samples 314 that correspond to a same level of reliability. Additionally, or alternatively, FEC device 130 may determine that a portion of the two or more samples 314 are to be selected and/or included within first merged subset 910.

FEC device 130 may, in one example, obtain a predetermined first weighting value (e.g., W1) associated with first subset 905 and a predetermined second weighting value (e.g., W2) associated with second subset 905. FEC device 130 may use the first weighting value and the second weighting value (e.g., where W1+W2=1, where 0≤W1≤1, and where 0≤W2≤1) to determine a probability regarding whether sample 314, to be selected from the two or more samples 314, corresponds to first subset 905 or second subset 905. The first weighting value and the second weighting value may be predetermined, by FEC device 130, in a manner that ensures that a processing bias is not introduced when processing and encoded word. For example, the processing bias may be avoided when there is an equal probability (e.g., when W1=W2=½ or 50 percent probability) that a first sample 314, selected by FEC device 130 from the two or more samples 314, corresponds to first subset 905 or second subset 905. FEC device 130 may create first merged subset 910 based on samples 314 associated with on the selected merged LRPs 415. The selected merged LRPs 415 may include one or more randomly selected samples 314 associated with a same level of reliability as one or more samples 314 that were not randomly selected.

If another segment is to be selected (block 820—YES), process 800 may include randomly selecting a next one of the segments (block 825). For example, FEC device 130 may, in a manner similar to that described above with respect to block 540 of FIG. 5, select a next segment (e.g., a third segment) from the segments associated with the encoded word. The next segment may include a next subset of samples 314 (e.g., a third subset of samples 314). The next segment may, for example, correspond to a segment that is adjacent to the second segment and/or the first segment. Alternatively, the next segment may correspond to a segment that is not adjacent to the second segment or the first segment. Additionally, or alternatively, the next segment may, in a manner similar to that described above with respect to block 520 of FIG. 5, correspond to a segment that is randomly selected from the segments that have not yet been selected by FEC device 130.

As also shown in FIG. 8, process 800 may include identifying LRPs associated with the next segment (block 830) and merging selected LRPs associated with the next segment and selected LRPs associated with the merged subset to create another merged subset (block 835). For example, FEC device 130 may, based on reliability values 410 and in a manner similar to that described above with respect to block 810, identify LRPs 415, associated with a next subset of samples 314, that correspond to the next segment (e.g., a third segment).

For example, as shown in FIG. 9, processing scheme 900 may include a third subset 905 (e.g., subset 905-3), that stores a third subset of samples 314. The third subset of samples 314 may be sorted based on reliability values associated with samples 314 within third subset 905. Third LRPs 415, associated with third subset 905, may be determined based on sorted samples 314 associated with reliability values that correspond to one or more lowest levels of reliability. Additionally, or alternatively, a fourth subset of samples 314, associated with first merged subset 910 may be sorted based on reliability values associated with samples 314 within first merged subset 910. Fourth LRPs 415, associated with first merged subset 910, may be determined based on sorted samples 314 associated with reliability values that correspond to one or more lowest levels of reliability.

A second merged subset 910 (e.g., merged subset 910-2 of FIG. 9) may be created by merging and/or combining all or a portion of the third LRPs 415 with all or a portion of the fourth LRPs 415 to create a set of merged LRPs 415. Additionally, or alternatively, second merged subset 910 may be created by selecting samples 314 that correspond to a portion of the set of merged LRPs 415 that correspond to one or more lowest levels of reliability.

Returning to FIG. 8, FEC device 130 may select a portion of samples 314, associated with a merged set of LRPs 415 (e.g., merged from third LRPs 415 and fourth LRPs 415), that correspond to lowest levels of reliability. The selected portion of samples 314 may be included within second merged subset 910. In one example, FEC device 130 may determine that the merged set of LRPs 415 includes two or more samples 314 that correspond to a same level of reliability. Additionally, or alternatively, FEC device 130 may determine that a portion of the two or more samples 314 are to be selected and/or to be included within second merged subset 910.

FEC device 130 may, in one example, obtain a predetermined third weighting value (e.g., W3) associated with third subset 905 and a predetermined fourth weighting value (e.g., W4) associated with first merged subset 910. FEC device 130 may use the third weighting value and the fourth weighting value (e.g., where W3+W4=1, where 0≤W3≤1, and where 0≤W4≤1) to determine a probability regarding whether sample 314, to be selected from the two or more samples 314, corresponds to third subset 905 or first merged subset 910. The third weighting value and the fourth weighting value may be predetermined, by FEC device 130, in a manner that ensures that a processing bias is not introduced when processing and encoded word. For example, the processing bias may be avoided when there is an equal probability (e.g., when W4>W3) that a first sample 314, selected by FEC device 130 from the two or more samples 314, corresponds to first subset 905, second subset 905, or third subset 905. In other words, the third weighting value and the fourth weighting value may be predetermined such that there is a greater probability that FEC device 130 selects the first sample 314 associated with first merged subset 910 than third subset 905.

By way of example, the third weighting value and the fourth weighting value may be predetermined (e.g., W3=⅓ and W4=⅔) to ensure that there is a two-thirds probability (e.g., $P_{M1}$=W4≈66.6%, where $P_{M1}$ represents a probability of being associated with first merged subset 910) that the first sample 314 corresponds to first merged subset 910 and a one-third probability (e.g., $P_{S3}$=W3≈33.3%, where $P_{S3}$ represents a probability of being associated with third subset 905) probability that the first sample 314 corresponds to third subset 905. The two-thirds probability that the first sample 314 corresponds to first merged subset 910, may ensure that there is a one-third probability the first sample 315 corresponds to first subset 905 based on the first weighting factor (e.g., $P_{S1}$=W1*W4=½*⅔=⅓≈33.3%, where $P_{S1}$ represents a probability of being associated with first subset 905). Similarly, the two-thirds probability, that the first sample 314 corresponds to first merged subset 910, may ensure that there is a one-third probability that the first sample 315 corresponds to second subset 905 based on the second weighting factor (e.g., $P_{S2}$=W2*W4=½*⅔=⅓≈33.3%, where $P_{S2}$ represents a probability of being associated with second subset 905). The equal probability that sample 314, associated with LRP 415 within the second merged subset 910, is associated with first subset 905, second subset 905, or third subset 905 may indicate that a processing bias is avoided when processing the encoded word.

Additionally, or alternatively, FEC device 130 may, in a manner similar to that described above with respect to block 825, select a next segment (e.g., a last segment), associated with the encoded word, that has not already be selected and/or processed. Additionally, or alternatively, FEC device 130 may, in a manner similar to that described above with respect to block 810, identify LRPs 415, associated with the next subset of samples 314, that correspond to the last segment.

For example, as shown in FIG. 9, processing scheme 900 may include a last subset 905 (e.g., subset 905-P), that stores a fifth subset of samples 314. The fifth subset of samples 314 may be sorted based on reliability values associated with samples 314 within last subset 905. Fifth LRPs 415, associated with last subset 905, may be determined based on sorted samples 314 associated with reliability values that correspond to one or more lowest levels of reliability. Additionally, or alternatively, a sixth subset of samples 314, associated with second merged subset 910 may be sorted based on reliability values associated with samples 314 within second merged subset 910. Sixth LRPs 415, associated with second merged subset 910, may be determined based on sorted samples 314 associated with reliability values that correspond to one or more lowest levels of reliability.

A third merged subset 910 (e.g., merged subset 910-3 of FIG. 9) may be created by merging and/or combining all or a portion of the fifth LRPs 415 with all or a portion of the sixth LRPs 415 to create a set of merged LRPs 415. Additionally, or alternatively, third merged subset 910 may be created by selecting samples 314 that correspond to a portion of the set of merged LRPs 415 that correspond to one or more lowest levels of reliability.

Returning to FIG. 8, FEC device 130 may select a portion of samples 314, associated with a merged set of LRPs 415 (e.g., merged from fifth LRPs 415 and sixth LRPs 415), that correspond to lowest levels of reliability. The selected portion of samples 314 may be included within third merged subset 910. In one example, FEC device 130 may determine that the merged set of LRPs 415 includes two or more samples 314 that correspond to a same level of reliability. Additionally, or alternatively, FEC device 130 may determine that a portion of the two or more samples 314 are to be selected and/or to be included within third merged subset 910.

FEC device 130 may, in one example, obtain a predetermined fifth weighting value (e.g., W5) associated with last subset 905 and a predetermined sixth weighting value (e.g., W6) associated with second merged subset 910. FEC device 130 may use the fifth weighting value and the sixth weighting value (e.g., where W5+W6=1, where $0 \le W5 \le 1$, and where $0 \le W6 \le 1$) to determine a probability regarding whether sample 314, to be selected from the two or more samples 314, corresponds to last subset 905 or second merged subset 910. The fifth weighting value and the sixth weighting value may be predetermined, by FEC device 130, in a manner that ensures that a processing bias is not introduced when processing and encoded word. For example, the processing bias may be avoided when there is an equal probability (e.g., when W6>W5) that a first sample 314, selected by FEC device 130 from the two or more samples 314, corresponds to first subset 905, second subset 905, third subset 905, or last subset 905. In other words, the fifth weighting value and the sixth weighting value may be predetermined such that there is a greater probability that FEC device 130 selects the first sample 314 associated with second merged subset 910 than last subset 905.

By way of example, the fifth weighting value and the fourth weighting value may be predetermined (e.g., W5=1;4 and W6=¾) to ensure that there is a three-fourths probability (e.g., $P_{M2}$=W6≈75%, where $P_{M2}$ represents a probability of being associated with second merged subset 910) that the first sample 314 corresponds to second merged subset 910 and a one-fourth probability (e.g., $P_{SL}$=W5≈25%, where $P_{SL}$ represents a probability of being associated with last subset 905) that the first sample 314 corresponds to last subset 905. The three-fourths probability, that the first sample 314 corresponds to second merged subset 910, may ensure that there is a one-fourth probability the first sample 315 corresponds to first subset 905 based on the first weighting value, the fourth weighting value, and the sixth weighting value (e.g., $P_{S1}$=W1\*W4\*W6=½\*⅔\*¾=¼≈25%). Similarly, the three-fourths probability, that the first sample 314 corresponds to first merged subset 910, may ensure that there is a one-fourth probability the first sample 315 corresponds to second subset 905 based on the second weighting value, the fourth weighting value, and the sixth weighting value (e.g., $P_{S2}$=W2\*W4\*W6=½\*⅔\*¾=¼≈25%). Additionally, or alternatively, the three-fourths probability, that the first sample 314 corresponds to first merged subset 910, may ensure that there is a one-fourth probability the first sample 315 corresponds to third subset 905 based on the third weighting value and the sixth weighting value (e.g., $P_{S3}$=W3\*W6=⅓\*¾=¼≈25%).

The equal probability that sample 314, associated with LRP 415, within third merged subset 910, is associated with first subset 905, second subset 905, third subset 905, or last subset 905 may indicate that a processing bias is avoided when processing the encoded word.

If another segment is not to be selected (block 820—NO), then process 800 may include selecting one or more LRPs from the merged subset (block 840) and processing the encoded word based on the selected LRPs (block 845). For example, FEC device 130 may, in a manner similar to that described above with respect to block 550 of FIG. 5, randomly select one or more LRPs 415 from a merged subset (e.g., the third merged subset). Additionally, or alternatively, FEC device 130 may analyze reliability values 410, associated with LRPs 415, associated with the merged subset, to select LRP 415 associated with a lowest reliability value 410. FEC device 130 may also, or alternatively, sort LRPs 415, based on reliability values 410, to identify and/or select one or more LRPs 415 associated with one or more lowest reliability values 410 (e.g., the lowest 1, 5, 10, etc). When two or more LRPs 415 are associated with a same lowest reliability value 410, FEC device 130 may randomly select one of the two or more LRPs 415 based on a random number using one or more of the techniques described above and/or some other technique.

FEC device 130 may, in a manner similar to that described above with respect to block 555 of FIG. 5, use the selected LRP 415 to create a candidate word, associated with the encoded word, that includes one or more inverted bits that correspond to the selected one or more LRPs 414. Similarly, FEC device 130 may also, or alternatively, select one or more other LRPs 415, from the first merged subset, to create one or more other candidate words based on the other LRPs 415. FEC device 130 may, using known soft forward error correction techniques, use the candidate word and/or the other candidate words to identify a version of the encoded word that includes fewer errors than are included within the encoded word.

Systems and/or methods, described herein, may allow a FEC device to perform a soft iterative forward error correction operation, on an encoded word, without introducing a processing bias into the operation. A conventional FEC device may introduce the processing bias when performing a conventional soft iterative forward error correction operation on the encoded word. The processing bias may correspond to a greater probability that an earlier occurring error, within the encoded word, may be selected, for correction by the conventional FEC device, over a later occurring error within the encoded word. Avoiding the processing bias may permit the FEC device to correct a greater quantity of errors, within traffic and over a period of time, than the conventional FEC device.

The foregoing description provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 5 and 8, the order of the blocks may be changed in other implementations. Also, non-dependent blocks may be performed in parallel.

Furthermore, while the disclosed embodiments have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

No element, act, or instruction used in the present application should be construed as critical or essential to the implementation unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   one or more devices to:
   receive a word, of a block of words within traffic, on which to perform a forward error correction operation, the word including a plurality of samples, each one of the plurality of samples including respective encoded bits and respective reliability bits, the respective reliability bits corresponding to a respective level of reliability of the respective encoded bits,
   select, in a random manner, a first subset of samples of the plurality of samples,
   identify one or more first samples, from the first subset, associated with one or more of lowest reliability bits within the first subset,
   select a second subset of samples of the plurality of samples,
   identify one or more second samples, from the second subset, associated with one or more of lowest reliability bits within the second subset,
   create a first merged subset based on selected one or more first samples and on selected one or more second samples,
   select a third subset of samples of the plurality of samples,
   identify one or more third samples, from the third subset, associated with one or more of lowest reliability bits within the third subset,
   identify two or more fourth samples, from the first merged subset, associated with one or more of lowest reliability bits within the first merged subset,
   create a second merged subset based on selected one or more third samples and on selected two or more fourth samples,
      the selected one or more third samples being fewer than the selected two or more fourth samples, and
      each of the two or more fourth samples corresponding to an equal probability of being associated with the first subset or the second subset,
   generate one or more candidates words based on one or more samples from the second merged subset, and
   process the word using the one or more candidate words.

2. The system of claim 1, where, when selecting the first subset, the one or more devices are further to:
   identify a plurality of subsets of samples associated with the word, each subset including a respective equal portion of samples of the plurality of samples,
   obtain a random number, and
   select, as the first subset, a subset of samples, of the plurality of subsets of samples, that corresponds to the random number.

3. The system of claim 1, where, when identifying the one or more first samples, the one or more devices are further to:
   sort samples, associated with the first subset, based on reliability bits associated with the first subset, and
   identify the one or more lowest reliability bits, within the first subset, based on sorting the samples.

4. The system of claim 1, where, when identifying the one or more first samples, the one or more devices are further to:
   determine that a first sample, of the one or more first samples, and a second sample, of the one or more first samples, are associated with a same level of reliability, and
   randomly select the first sample or the second sample as at least one of the one or more first samples.

5. The system of claim 1, where, when creating the first merged subset, the one or more devices are further to:
   obtain a first weighting value associated with the first subset and a second weighting value associated with the second subset, the first weighting value and the second weighting value enabling an equal probability that samples, associated with the first subset and the second subset, are equally apportioned within the first merged subset,
   select at least one first sample, from the one or more first samples, based on the first weighting value, and
   select at least one second sample, from the one or more second samples, based on the second weighting value.

6. The system of claim 1, where the one or more devices are further to:
   store, in a storage device associated with the system, the selected one or more first samples and the selected one or more second samples, the selected one or more first samples and the selected one or more second samples occupying less storage space, in the storage device, than the first subset and the second subset,
   discard samples associated with the first subset when the selected one or more first samples are stored in the storage device, and
   discard samples associated with the second subset when the selected one or more second samples are stored in the storage device.

7. The system of claim 1, where, when creating the second merged subset, the one or more devices are further to:
   obtain a first weighting value associated with the third subset and a second weighting value associated with the second merged subset,
      the first weighting value being less than the second weighting value, and
      the first weighting value and the second weighting value enabling third samples, associated with the third subset, and fourth samples, associated with the second merged subset, to be apportioned within the second merged subset,
   select at least one third sample, from among the one or more third samples, based on the first weighting value,
   select at least two fourth samples, from among the two or more fourth samples, based on the second weighting value, and create the second merged subset based on the at least one third sample and the at least two fourth samples.

8. The system of claim 7, where, when the first weighting value is less than the second weighting value, there is an equal probability that a sample, associated with the second merged subset, is associated with the first subset, the second subset, or the third subset.

9. A method comprising:
receiving, from an optical receiver and by a device, a plurality of words within traffic, each of the plurality of words including a plurality of samples, each of the plurality of samples including:
a corresponding one of a plurality of encoded bits, and respective reliability bits for identifying a respective level of reliability of the corresponding one of the plurality of encoded bits;
identifying, by the device and within a word of the plurality of words, subsets of the plurality of samples associated with the word, each of the subsets including a respective equal portion of the plurality of samples;
selecting, by the device, a first one of the subsets and a second one of the subsets, the first one of the subsets or the second one of the subsets being selected in a random manner;
determining, by the device, lowest first reliability bits within the first one of the subsets and lowest second reliability bits within the second one of the subsets;
creating, by the device, a first merged subset, based on first selected samples associated with lowest reliability bits of first samples from the first one of the subsets and based on second samples from the second one of the subsets,
the first samples corresponding to the lowest first reliability bits, and
the second samples corresponding to the lowest second reliability bits;
determining, by the device, lowest third reliability bits within a third one of the subsets;
creating, by the device, a second merged subset based on second selected samples associated with lowest reliability bits from among the first selected samples and third samples of the third one of the subsets,
the third samples corresponding to the lowest third reliability bits, and
there being an equal probability that the second merged subset includes at least two of the first selected samples and at least one of the third samples,
generating, by the device, candidate words based on one or more of the second selected samples; and
processing, by the device, the word using the candidate words.

10. The method of claim 9, where selecting the first one of the subsets and the second one of the subsets further includes:
obtaining a random number; and
selecting the first one of the subsets that corresponds to the random number.

11. The method of claim 9, where selecting the first one of the subsets and the second one of the subsets further includes one of:
selecting, as the second one of the subsets, one of the subsets that is adjacent to the first one of the subsets; or
selecting the second one of the subsets based on a random number that corresponds to the second one of the subsets.

12. The method of claim 9, where determining the lowest first reliability bits and the lowest second reliability bits includes:

sorting samples associated with the first one of the subsets based on reliability bits that correspond to the samples associated with the first one of the subsets;
identifying the lowest first reliability bits based on sorting the samples associated with the first one of the subsets;
sorting samples associated with the second one of the subsets based on reliability bits that correspond to the samples associated with the second one of the subsets; and
identifying the lowest second reliability bits based on sorting the samples associated with the second one of the subsets.

13. The method of claim 9, where creating the first merged subset further includes:
selecting the first samples, from among samples associated with the first one of the subsets, to which the lowest first reliability bits correspond;
selecting the second samples, from among samples associated with the second one of the subsets, to which the lowest second reliability bits correspond;
discarding the samples associated with the first one of the subsets based on an indication that the first samples are selected; and
discarding the samples associated with the second one of the subsets based on an indication that the second samples are selected.

14. The method of claim 9, where a quantity of the first samples is equal to a quantity of the second samples, and
where there is an equal probability that one of the first selected samples is associated with the first samples or the second samples.

15. The method of claim 9, where creating the second merged subset further includes:
obtaining a first weighting value and a second weighting value, the first weighting value and second weighting value identifying how samples, selected from the first selected samples and the third samples, are to be apportioned in the second merged subset;
obtaining, from the first merged subset, the first selected samples based on the first weighting value;
obtaining, from the third subset, the third samples based on the second weighting value;
identifying the lowest reliability bits associated from among the first selected samples and the third samples; and
selecting the second selected samples that correspond to the identified lowest reliability bits.

16. The method of claim 15, where the first weighting value is greater than the second weighting value, and
where the first weighting value and the second weighting value create an equal probability that a sample, of the second selected samples, corresponds to the first one of the subsets, the second one of the subsets, or the third one of the subsets.

17. The method of claim 9, further comprising:
determining that a first sample, of the second selected samples and a second sample of the second selected samples correspond to a level of reliability, and
randomly select, as one of the one or more second selected samples, the first sample or the second sample.

18. A device comprising:
a memory to store a block of words that are generated as a result of an forward error correction operation, each word, of the block of words, including a plurality of samples, a particular one of the plurality of samples including encoded bits and reliability bits, the reliability bits identifying a level of reliability of the encoded bits; and one or more components to:
  obtain a word from the block of words within traffic,
  identify, in a random manner, a first segment of the word, the first segment including a first subset of samples of a plurality of samples associated with the word,
  select one or more first samples, from the first subset of samples, associated with one or more of first lowest reliability bits within the first subset of samples,
  identify a second segment associated with the word, the second segment including a second subset of samples of the plurality of samples associated with the word,
  select one or more second samples, from the second subset of samples, associated with one or more of second lowest reliability bits within the second subset of samples,
  identify a third segment associated with the word, the third segment including a third subset of samples of the plurality of samples associated with the word,
  select one or more third samples, from the third subset of samples, associated with one or more of third lowest reliability bits within the third subset of samples,
  identify lowest reliability bits within the one or more first lowest reliability bits, the one or more second lowest reliability bits, and the one or more third lowest reliability bits,
  create a merged subset of samples based on selected samples from the one or more first samples, the one or more second samples and the one or more third samples,
    the selected samples corresponding to the lowest reliability bits,
  select at least one sample from the merged subset,
  generate two or more candidate words based on the at least one sample, and
  process the word using the two or more candidate words.

19. The device of claim 18, where, when identifying the first segment, the one or more components are to:
  identify a quantity of samples to be included within segments of words associated with the block of words,
  identify a plurality of segments, associated with the word, based on the identified quantity of samples,
  obtain a first random number, and
  select the first segment, of the identified plurality of segments, that corresponds to the first random number.

20. The device of claim 19, where, when identifying the second segment, the one or more components are to at least one of:
  obtain a second random number, or
  identify a segment, of the identified plurality of segments, that is adjacent to the first segment, and
  select, as the second segment, the identified segment or another segment, of the plurality of segments, that corresponds to the second random number.

21. The device of claim 19, where, when identifying the third segment, the one or more components are to at least one of:
  obtain a third random number, or
  identify a segment, of the identified plurality of segments, that is adjacent to the first segment or the second segment, and
  select, as the third segment, the identified segment or a further segment, of the plurality of segments, that corresponds to the third random number.

22. The device of claim 18, where, when selecting the one or more first samples, the one or more components are to:
  sort the first subset of samples based on reliability bits that correspond to the first subset of samples,
  identify the one or more first lowest reliability bits, within the first subset of samples, based on sorting the first subset of samples, and
  identify the one or more first samples that correspond to the one or more first lowest reliability bits within the first subset of samples.

23. The device of claim 18, where the one or more components are further to:
  store the merged subset of samples in the memory,
  discard the one or more first samples, the one or more second samples, and the one or more third samples based on storing the merged subset of samples in the memory.

24. The device of claim 18, where the merged subset of samples occupies less memory space than one or more of the one or more first samples, the one or more second samples, or the one or more third samples.

25. The device of claim 18, where, when selecting the at least one sample, the one or more components are to:
  sort the merged subset of samples based on reliability bits associated with the merged subset of samples,
  identify at least one reliability bit, of the reliability bits associated with the merged subset, based on the sorted merged subset of samples,
    the at least one reliability bit corresponding to a level of reliability that is lower than another level of reliability to which other reliability bits, of the reliability bits associated with the merged subset of samples, correspond, and
  identify the at least one sample that corresponds to the at least one reliability bit,
    the identification, of the at least one sample, permitting an equal probability that the at least one sample is associated with the first subset, the second subset, or the third subset.

26. The device of claim 18, where, when selecting the at least one sample, the one or more components are to:
  determine that a first sample within the merged subset and a second sample, within the merged subset, are associated with a lowest level of reliability,
  randomly select, as the at least one sample, the first sample or the second sample when the first sample and the second sample are associated with the lowest level of reliability,
    the random selection permitting an equal probability that the at least one sample is associated with the first subset, the second subset, or the third subset.

* * * * *